(12) United States Patent
Ghonasgi et al.

(10) Patent No.: US 7,955,401 B2
(45) Date of Patent: *Jun. 7, 2011

(54) HYDROTREATING AND CATALYTIC DEWAXING PROCESS FOR MAKING DIESEL FROM OILS AND/OR FATS

(75) Inventors: Dhananjay R. Ghonasgi, Bartlesville, OK (US); Edward L. Sughrue, II, Bartlesville, OK (US); Jianhua Yao, Bartlesville, OK (US); Xiaochun Xu, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 889 days.

This patent is subject to a terminal disclaimer.

(21) Appl. No.: 11/778,295

(22) Filed: Jul. 16, 2007

(65) Prior Publication Data

US 2009/0019763 A1 Jan. 22, 2009

(51) Int. Cl.
*C10L 1/16* (2006.01)

(52) U.S. Cl. ......... 44/308; 44/385; 208/213; 208/216 R; 208/217; 260/409; 502/305; 502/307; 585/14; 585/240

(58) Field of Classification Search .................... 44/308, 44/385, 389; 208/213, 216 R, 217; 260/409; 502/305, 307; 585/14, 240
See application file for complete search history.

(56) References Cited

U.S. PATENT DOCUMENTS

| 3,894,938 A | 7/1975 | Gorring et al. |
| 4,300,009 A | 11/1981 | Haag et al. |
| 4,328,128 A | 5/1982 | Stanulonis et al. |
| 4,420,388 A | 12/1983 | Bertolacini et al. |
| 4,437,976 A | 3/1984 | Oleck et al. |
| 4,472,266 A | 9/1984 | Oleck et al. |
| 4,575,382 A | 3/1986 | Sweeney et al. |
| 4,597,854 A | 7/1986 | Penick |
| 4,743,354 A | 5/1988 | Ward |
| 4,764,265 A | 8/1988 | Bijwaard et al. |
| 4,810,356 A | 3/1989 | Grootjans et al. |
| 4,992,605 A | 2/1991 | Craig et al. |
| 5,578,090 A | 11/1996 | Bradin |
| 5,705,722 A | 1/1998 | Monnier et al. |
| 6,235,955 B1 | 5/2001 | Yao et al. |
| 6,249,170 B1 | 6/2001 | Main et al. |
| 6,436,870 B1 * | 8/2002 | Iijima et al. .................... 502/305 |
| 2003/0143135 A1 | 7/2003 | O'Rear et al. |
| 2003/0178344 A1 | 9/2003 | Plantenga et al. |
| 2004/0033908 A1 | 2/2004 | Deckman et al. |
| 2004/0055209 A1 | 3/2004 | Jakkula et al. |
| 2004/0154958 A1 | 8/2004 | Alexander et al. |
| 2004/0230085 A1 | 11/2004 | Jakkula et al. |
| 2006/0175231 A1 | 8/2006 | Hansen et al. |
| 2006/0247332 A1 | 11/2006 | Coffey et al. |
| 2007/0010682 A1 | 1/2007 | Myllyoja et al. |
| 2007/0142242 A1 | 6/2007 | Gleeson et al. |

FOREIGN PATENT DOCUMENTS

| EP | 1224970 | 7/2002 |
| EP | 1396531 | 3/2004 |

OTHER PUBLICATIONS

W. Baldauf, U. Balfanz, and T. Hohmann; Biomass Derived Transportation Fuel in Petroleum Refineries; Biomass for Energy, Environment, Agriculture and Industry; (1995); pp. 1129-1139; Proceeding of the European Biomass Conference, Vienna, Elsevier.

Mark Stumborg, Al Wong; and Edhogan; Hydroprocessed Vegetable Oils for Diesel Fuel Improvement; Bioresource Technology 56, Elsevier Science Limited; (1996) pp. 13-18; Great Britain.

E.G. Shay; Diesel Fuel from Vegetable Oils: Status and Opportunities; Biomass and Bioenergy, 4, p. 227, (1993).

W. Baldauf and M. Rupp; Processing of Rape Oil in Mineral Oil Refineries; Biomass Energy, Ind. Environ. 831-5 (1992).

* cited by examiner

*Primary Examiner* — Prem C Singh

(57) ABSTRACT

Methods for producing C10-C30 hydrocarbons from fatty materials, such as triglyceride compounds, are provided. Hydrocarbon compounds, particularly those boiling in the temperature range of between about 80° F. to about 1000° F., are produced by contacting a fatty material with at least one catalyst comprising cobalt and molybdenum on a zeolite support under hydrotreating conditions. Additional hydrotreating catalysts may also be used to further improve the properties of the hydrocarbon product.

22 Claims, No Drawings

HYDROTREATING AND CATALYTIC DEWAXING PROCESS FOR MAKING DIESEL FROM OILS AND/OR FATS

BACKGROUND OF THE INVENTION

1. Field of the Invention

The present invention relates generally to methods for converting fatty materials, such as triglycerides, diglycerides, monoglycerides, fatty acids, and combinations thereof to hydrocarbon compounds. Particularly, the methods of the present invention comprise contacting the fatty materials with a catalyst comprising cobalt and molybdenum on a zeolite support under hydrotreating conditions. Additional hydrotreating catalysts may also be used in order to produce a hydrocarbon-containing product exhibiting improved cold flow properties when compared with the products of conventional hydrotreating processes.

2. Description of the Prior Art

As the demand for hydrocarbon fuels increases, the incentives for developing renewable hydrocarbon sources increase as well. Various economic, environmental and political pressures are driving the development of alternative energy sources that are compatible with existing technologies and infrastructure. The development of renewable hydrocarbon fuel sources, such as plant and animal sources, has been proposed as a solution to this problem.

"Bio-Diesel" is one such product that may be produced by subjecting a base vegetable oil to a transesterification process using methanol to convert the base oil to desired methyl esters. After processing, the products have very similar combustion properties as compared to petroleum-derived hydrocarbons. However, Bio-Diesel exhibits a number of down sides, especially its poor oxidative stability, propensity to gel in cold climates, and its cost.

Unmodified vegetable oils and fats have also been used as additives in diesel fuel to lower cost and improve the lubricity of the fuel. However, problems such as injector coking and the degradation of combustion chamber conditions have been associated with these unmodified additives. Processes for converting vegetable oil into hydrocarbons have been developed. However, these processes have often involved harsh reaction conditions, or the products from the reaction exhibit undesirable properties (such as high pour and cloud points) which render them unsuitable for use in diesel fuel.

Therefore, a need exists for a process for converting vegetable oils and fats into hydrocarbon compounds in the diesel fuel boiling range which exhibit cold flow properties suitable for use in diesel fuel. Such process should also yield significant quantities of C10-C30 hydrocarbon compounds for improving the cetane rating of diesel fuel.

SUMMARY OF THE INVENTION

Accordingly, in one embodiment, the present invention provides a process comprising the step of contacting a fluid comprising at least one fatty material selected from the group consisting of triglycerides, diglycerides, monoglycerides, free fatty acids and combinations thereof with a catalyst comprising cobalt and molybdenum on a zeolite support. The process occurs under conditions sufficient for converting at least a portion of the at least one fatty material into at least one member selected from the group consisting of C10-C30 hydrocarbons and combinations thereof.

In another embodiment, the present invention provides a process comprising contacting a fluid comprising at least one fatty material selected from the group consisting of triglycerides, diglycerides, monoglycerides, and free fatty acids with a dewaxing catalyst and a hydrotreating catalyst. The process is carried out under conditions sufficient for converting at least a portion of the at least one fatty material into at least one member selected from the group consisting of C10-C30 hydrocarbons and combinations thereof.

DETAILED DESCRIPTION OF THE PREFERRED EMBODIMENT

In one embodiment of the present invention, an improved hydrotreating process is provided for converting fatty materials, especially those selected from the group consisting of triglycerides, diglycerides, monoglycerides, free fatty acids, and combinations thereof into C10-C30 hydrocarbons, especially diesel boiling range hydrocarbons. The process results in a reaction product having enhanced cold flow properties when compared to products produced according to more conventional hydrotreating methods. The improved process comprises hydrotreating an organic feed including at least one fatty material using a catalyst comprising cobalt and molybdenum on a zeolite support. In certain embodiments, the zeolite that forms a part of the hydrotreating catalyst is ZSM-5.

A reaction feed comprising at least one fatty material is supplied to the hydrotreating process. As used herein, the term "fatty material" refers to a product that comprises, consists of, or consists essentially of a fatty acid or residue thereof. In certain embodiments, the fatty material is selected from the group consisting of triglycerides, diglycerides, monoglycerides, and free fatty acids. The term "triglyceride" generally refers to a naturally occurring ester of a fatty acid and/or glycerol having the general formula $CH_2(OCOR_1)$—$CH(OCOR_2)CH_2(OCOR_3)$, where $R_1$, $R_2$, and $R_3$ are the same or different and may vary in chain length. Di- and monoglycerides comprise one or two fewer ester moieties, respectively. In certain embodiments, the fatty material, especially the triglyceride compound, is selected from the group consisting of vegetable oil, yellow grease (such as used restaurant oil or those derived from used cooking oils), animal fats, and mixtures thereof. Exemplary vegetable oils include, but are not limited to soybean oil, corn oil, peanut oil, sunflower seed oil, coconut oil, babassu oil, grape seed oil, poppy seed oil, almond oil, hazelnut oil, walnut oil, olive oil, avocado oil, sesame oil, tall oil, cottonseed oil, palm oil, rice bran oil, canola oil, cocoa butter, shea butter, butyrospermum, wheat germ oil, illipse butter, meadowfoam, seed oil, rapeseed oil, borange seed oil, linseed oil, caster oil, vernoia oil, tung oil, jojoba oil, ongokea oil. Exemplary animal fats include tallow animal fat, beef fat, chicken fat, pork fats, poultry grease, and milk fat.

The reaction feed may also include at least one hydrocarbon compound having a boiling point of between about 80° F. to about 1000° F. Exemplary hydrocarbon compounds include middle distillate fuels. Middle distillate fuels generally contain hydrocarbons that boil in the middle distillate boiling range of between about 300° F. to about 750° F. Typical middle distillate fuels include those selected from the group consisting of gasoline, naphtha, jet fuel, kerosene, diesel fuel, light cycle oil (LCO), vacuum gas oil, atmospheric gas oil, atmospheric tower bottoms, and combinations thereof. In one embodiment, the middle distillate fuel presents an API gravity (ASTM D287) of between about 20 to about 50. In addition, the middle distillate fuels present a minimum flash point (ASTM D93) of greater than about 80° F., and in other embodiments, greater than abut 90° F.

Hydrocarbon compounds present in the reaction feed may also contain a quantity of aromatics, olefins, and sulfur, as well as paraffins and naphthenes. The amount of aromatics in the hydrocarbon generally may be in an amount of between about 0 to about 100 weight % based on the total weight of the hydrocarbons. In one embodiment, aromatics are present in an amount of between about 20 to about 80 weight %. The amount of olefins in the hydrocarbon generally may be in an amount of less than about 10 weight % based on the total weight of the hydrocarbon. In one embodiment, the olefins are present in an amount of less than about 5 weight %, and in still another embodiment, olefins are present in an amount of less than about 2 weight %.

The amount of sulfur in the hydrocarbon can generally be greater than about 50 parts per million by weight (ppmw). In one embodiment, sulfur is present in an amount of between about 100 ppmw to about 50,000 ppmw, and in another embodiment, sulfur is present in an amount of between about 150 to about 4,000 ppmw. As used herein, the term "sulfur" denotes elemental sulfur, and also any sulfur compounds normally present in a hydrocarbon stream, such as diesel fuel. The catalysts used with the present invention may also serve to remove sulfur compounds present in the hydrocarbon portion of the reaction feed. Exemplary sulfur compounds which may be removed include, but are not limited to, hydrogen sulfide, carbonyl sulfide (COS), carbon disulfide, mercaptans (RSH), organic sulfides (R—S—R), organic disulfides R—S—S—R), thiophene, substituted thiophenes, organic trisulfides, organic tetrasulfides, benzothiophene, alkyl thiophenes, dibenzothiophene, alkyl benzothiophenes, alkyl dibenzothiophenes, and mixtures thereof, as well as heavier molecular weights of the same, wherein each R can be an alkyl, cycloalkyl, or aryl group containing about 1 to about 10 carbon atoms.

The reaction feed generally comprises between about 0.1 to about 99.9 weight % fatty material, based on the total weight of the feed. In other embodiments, the feed comprises between about 2 to about 80 weight % fatty material, and in still other embodiments, the feed comprises between about 5 to about 30 weight % fatty material. If present, the hydrocarbon compound generally comprises between about 0.1 to about 99.9 weight % of the feed. In other embodiments, the feed comprises between about 10 to about 98 weight % of the hydrocarbon compound, and in still other embodiments, the feed comprises between about 50 to about 95 weight % of the hydrocarbon compound. In certain embodiments, the weight ratio of fatty material to hydrocarbon in the reaction feed is between about 1:1000 to about 1000:1. In other embodiments, the weight ratio of fatty material to hydrocarbon in the reaction feed is between about 1:50 to about 50:1. In still other embodiments, the weight ratio of fatty material to hydrocarbon in the reaction feed is between about 1:25 to about 25:1.

The reaction feed is contacted with the hydrotreating catalyst within a reaction zone under conditions sufficient for converting at least a portion of the at least one fatty material present in the feed into a member selected from the group consisting of C10-C30 hydrocarbons and combinations thereof. The reaction zone may comprise any suitable reactor that enables intimate contact of the reactants and control of the operating conditions. Exemplary reactors include fixed bed reactors and fluidized bed reactors. As used herein, the term "fluidized bed reactor" denotes a reactor wherein a fluid feed can be contacted with solid particles in a manner such that the solid particles are at least partly suspended within the reaction zone by the flow of the fluid feed through the reaction zone and the solid particles are substantially free to move about within the reaction zone as driven by the flow of the fluid feed through the reaction zone.

Generally, the reaction zone is maintained at a temperature of between about 500° F. to about 800° F., and in certain embodiments, at a temperature of between about 700° F. to about 800° F. The pressure in the reaction zone is generally between about 100 psig to about 2000 psig. In one embodiment employing a fixed bed reactor, the pressure is maintained between about 100 psig to about 2000 psig. In one embodiment employing a fluidized bed reactor, the pressure is maintained between about 400 psig to about 2000 psig.

The reaction feed may also be contacted with the hydrotreating catalyst in the presence of a hydrogen-containing diluent in order to facilitate conversion of the fatty material into the desired hydrocarbons. Generally, the hydrogen-containing diluent comprises at least about 25 volume % hydrogen based on the total volume of the hydrogen-containing diluent. In certain embodiments, the hydrogen-containing diluent comprises more than about 50 volume % hydrogen, and in other embodiments, more than about 75 volume % hydrogen. The hydrogen-containing diluent may also comprise various inert components such as nitrogen, helium, argon, or carbon dioxide.

The rate at which the hydrogen-containing diluent is charged to the reaction zone is generally in the range of from about 300 standard cubic feet per barrel (SCFB) of reactants to about 10,000 SCFB. In one embodiment, the hydrogen-containing diluent is charged to the reaction zone in the range of about 1,200 SCFB to about 8,000 SCFB. In another embodiment, the hydrogen-containing diluent is charged to the reaction zone in the range of about 2,500 SCFB to about 6,000 SCFB. In still another embodiment, the hydrogen-containing diluent is charged to the reaction zone in the range of about 3,000 to about 5,000 SCFB. Generally, the fatty material, optional hydrocarbon, and hydrogen-containing diluent may be simultaneously introduced into the reaction zone via a common inlet port. In one embodiment, the hydrocarbon, fatty material and hydrogen-containing diluent are combined prior to introduction into the reaction zone, and are thereafter co-fed into the reaction zone.

As used herein, the term "liquid hourly space velocity" or "LHSV" refers to the numerical ratio of the rate at which the reactants are charged to the reaction zone in barrels per hour at standard conditions of temperature and pressure (STP) divided by the barrels of catalyst contained in the reaction zone to which the reactants are charged. In certain embodiments, the LHSV is between about $0.5\ hr^{-1}$ to about $5\ hr^{-1}$. In other embodiments, the LHSV is between about $1.0\ hr^{-1}$ to about $5\ hr^{-1}$. In still other embodiments, the LHSV is between about $1.8\ hr^{-1}$ to about $3.0\ hr^{-1}$.

The reaction product generally comprises gas and liquid fractions containing hydrocarbon products, which include, but are not limited to, diesel boiling range hydrocarbons. The reaction product generally comprises long chain carbon compounds having 10-30 or more carbon atoms per molecule, especially those selected from the group consisting of C10-C30 hydrocarbons and combinations thereof. In certain embodiments, the reaction product comprises between about 0.1 to about 99.9 weight % of C10-C30 hydrocarbons. In other embodiments, the reaction product comprises between about 10 to about 98 weight % of C10-C30 hydrocarbons. In addition, the reaction product can further comprise by-products of carbon monoxide, carbon dioxide, and propane.

Generally, the hydrocarbon products of the hydrotreating process have a sulfur content that is substantially less than the sulfur content present in the reaction feed. The sulfur content of the product is at least 25% less than the sulfur content present in the reaction feed. In another embodiment, the sulfur content of the product is at least 50% less than the sulfur content present in the reaction feed. In still another embodiment, the sulfur content of the product is at least 75% less than the sulfur content present in the reaction feed.

The cetane number of the hydrocarbon product is determined using ASTM test method D 613.65. For example, the cetane number for a light cycle oil (LCO) feed stock is typically less than 28, and may in some instances be less than 26 or less than 24. Generally, the cetane number of the hydrocarbon product produced in accordance with the present invention will have a cetane number greater than that of the original feedstock.

The pour point of the hydrocarbon product is determined using ASTM test method D 97. Generally, the pour point is the lowest temperature at which a petroleum product will begin to flow. In certain embodiments, the hydrocarbon product of the hydrotreating process presents a pour point of below about 10° F. In one embodiment, the hydrocarbon product presents a pour point is between about −30° F. to about 5° F. In another embodiment, the hydrocarbon product presents a pour point of between about −25° F. to about 0° F. In still another embodiment, the hydrocarbon product presents a pour point of between about −20° F. to about −10° F. In yet other embodiments, the hydrocarbon product presents a slightly higher pour point of between about 5° F. to about 10° F.

The cloud point of the hydrocarbon product is determined using ASTM test method D 2500. Generally, the cloud point is the temperature at which dissolved solids, such as wax crystals, begin to form in a petroleum product as it is cooled. In one embodiment, the hydrocarbon product of the hydrotreating process present cloud points of less than about 20° F. In one embodiment, the hydrocarbon product presents a cloud point of between about −20° F. to about 10° F. In another embodiment, the hydrocarbon product presents a cloud point of between about −15° F. to about 5° F. In still another embodiment, the hydrocarbon product presents a cloud point of between about −12° F. to about 0° F. In yet other embodiments, the hydrocarbon product presents slightly higher cloud points of between about 10° F. to about 20° F.

The liquid yield (v/v) of the hydrotreating process is generally between about 0.60 to about 1.0. In one embodiment, the liquid yield is between about 0.75 to about 0.99, and in another embodiment, the liquid yield is between about 0.8 to about 0.98. In yet another embodiment, the liquid yield is between about 0.85 to about 0.95.

The liquid yield of the hydrotreating process may be improved without significantly impairing the cold flow properties of the reaction product using a modified zeolite catalyst, particularly a modified ZSM-5 catalyst. The process of forming the modified catalyst begins with one or more treatment steps on the zeolite support for the catalyst. The zeolite support, prior to depositing of the cobalt and molybdenum thereon, undergoes an acid leaching step and/or a steam treatment step. In the acid leaching step, the zeolite, which comprises at least some alumina as a binder, is contacted with an acid for a sufficient period of time to remove (or leach out) at least a portion of the alumina present therein. In one embodiment, the acid used is hydrochloric acid, however any strong acid capable of leaching out the alumina may be used. In one embodiment, the zeolite support is contacted with the acid at a temperature of between about 70° C. to about 100° C. for between about 1 to about 3 hours. Thus, the acid leaching step removes significant amounts of alumina from the zeolite so that the end catalyst comprises very little, or substantially no alumina. The catalyst formed using the modified zeolite support comprises less than about 10 weight % alumina. In one embodiment, the modified zeolite catalyst comprises less than about 5 weight % alumina; and in yet another embodiment, the modified zeolite catalyst comprises less than about 1 weight % alumina.

After the leaching process, the acid is removed from the support and washed, such as with distilled water, to remove any acid residues. The zeolite support may then undergo a steam treatment process during which it is contacted with steam at a temperature of between about 400° C. to about 750° C. In one embodiment, the support is contacted with steam at a temperature of between about 500° C. to about 700° C. The steam treatment step may last for at least about 2 hours, and in one embodiment, for between about 2 to about 6 hours. The cobalt and molybdenum is then loaded onto the zeolite support in much the same way as would occur during the preparation of the above-described Co/Mo on zeolite catalyst. The zeolite support is contacted with cobalt and molybdenum compounds in solution. In one embodiment, the solutions comprise ammonium molybdate and cobalt nitrate. The catalyst is then dried and calcined. In one embodiment, calcining occurs at a temperature of between about 400° C. to about 600° C., and in another embodiment at a temperature of between about 425° C. to about 500° C. The calcining may last for up to about 8 hours, however, in one embodiment, the calcining step lasts for between about 3-7 hours.

The hydrotreating conditions using the modified zeolite catalyst are the same as those described above. The product of the hydrotreating process is also very similar to that described above. The cold flow properties of the hydrocarbon product may be slightly less favorable, but still within acceptable ranges and a vast improvement over conventional hydrotreating technologies. Further, a much greater liquid yield can be achieved.

In another aspect of the present invention, hydrodewaxing catalysts, such as the Co/Mo on zeolite catalysts described above, can be used in conjunction with other hydrotreating catalysts, such as Co/Mo on alumina, in a dewaxing/hydrotreating for the production of hydrocarbons from fatty materials. In one embodiment, the process comprises contacting a fluid comprising at least one fatty material with two different catalysts: a dewaxing catalyst and a hydrotreating catalyst.

Typically, a dewaxing catalyst operates to mildly crack or isomerize the n-paraffins or n-alkyl groups of hydrocarbon compounds in order to reduce the cloud and/or pour points thereof and to remove sulfur therefrom. Dewaxing catalysts generally comprise a hydrogenation component and a porous acidic support, such as a zeolite, a molecular sieve, alumina-silica, and combinations thereof. The support functions to selectively crack or isomerize the hydrocarbon molecules depending upon the size thereof. In one embodiment, the dewaxing catalyst is a catalyst comprising a Group VIB metal and a Group VIII metal (of the CAS periodic table) on a porous acidic support. In another embodiment, the dewaxing catalyst comprises cobalt and molybdenum on a zeolite support, particularly those described above. It is understood that the "dewaxing catalyst" may also exhibit hydrotreating capabilities. Therefore, the term "dewaxing catalyst" is used primarily for convenience in distinguishing the two different catalysts used in this particular process and should not be construed as limiting the scope of the invention in any way.

The second type of catalyst is referred to as a "hydrotreating catalyst." Generally, the hydrotreating catalyst may be any catalyst known in the art to be suitable for hydrotreating operations, especially those catalysts which comprise a Group VIII metal and a Group VIB metal (of the CAS periodic table) on a porous support. In certain embodiments, the hydrotreating catalyst comprises cobalt and molybdenum on an alumina support.

The dewaxing and hydrotreating catalysts may be disposed within a common reaction vessel, such as a fluidized or fixed bed reactor, or in separate vessels connected in series. The reactor feed may be formulated in any manner described above. However, in certain embodiments, the feed comprises at least one fatty material compound and, optionally, at least one hydrocarbon compound. The reactor(s) may also be charged with a hydrogen-containing diluent fluid, as described above. The conditions within the reactor(s) and the reaction products may be the same as those described above for a hydrotreating process.

It has been discovered that the order in which the fatty material-containing feed contacts the catalysts unexpectedly affects the cold flow properties and sulfur content of the reaction product, and the liquid yield of the process. In certain embodiments of the invention, the above properties can be improved by contacting the reactor feed first with the dewaxing catalyst, followed by the hydrotreating catalyst. In one embodiment, the dewaxing and hydrotreating catalysts are contained within a common reactor and arranged as at least one layer of dewaxing catalyst followed by at least one layer of hydrotreating catalyst. The reactor may include a plurality of alternating layers of dewaxing and hydrotreating catalysts. In another embodiment, the dewaxing catalyst is contained within a first reactor and the hydrotreating catalyst is contained within a second reactor. Further, this embodiment may include a plurality of alternating reactors of dewaxing and hydrotreating catalysts.

As illustrated in Example 2 below, by contacting the reactor feed with both a dewaxing and a hydrotreating catalysts, the cold flow properties of the reaction product can be improved and the sulfur content of the reaction product decreased when compared to the reaction products of a hydrotreating process employing either the dewaxing catalyst or the hydrotreating catalyst. Further, by contacting the reactor feed with the dewaxing catalyst and then subsequently with the hydrotreating catalyst (as opposed to the hydrotreating catalyst first followed by the dewaxing catalyst), the liquid yield of the reaction can also be improved. The liquid yield of a process employing alternating layer of reactors of dewaxing and hydrotreating catalysts may be the same as the hydrotreating process described above.

EXAMPLE 1

In this example, four different hydrotreating catalysts were prepared and tested. The cold flow properties of the resulting, hydrotreated diesel fuel blends were determined.

Catalyst 1 was a Co/Mo on alumina hydrotreating catalyst available under the designation TK-574 from Haldor Topsoe, Inc., Houston, Tex. Catalysts 2-4 are also Co/Mo containing catalysts, but comprise different support materials. Catalysts 2-4 were synthesized using a solution prepared by dissolving 5.0 g of ammonium molybdate and 4.0 g of cobalt nitrate in 20 ml of water. The solution was then added dropwise to 25 g of the support material. The catalyst was dried overnight at 120° C., and subsequently calcined at 450° C. for 6 hours. The support used for catalyst 2 was 1/16 inch alumina spheres available form Mallinckrodt Specialty Chemicals Co. The support used for catalyst 3 was a ZSM-5 zeolite available from Sud-Chemie under the designation T4480. The support for catalyst 4 was also T4480 zeolite, however, this zeolite underwent a modification process before being contacted with the Co/Mo solution.

The support for catalyst 4 (i.e., the modified ZSM-5 zeolite) first underwent an acid leaching process, to remove alumina from the support, followed by steam treatment. During acid leaching, the ZSM-5 was contacted with hydrochloric acid at 90° C. for 2 hours with stirring. At the conclusion of the acid leaching process, the acid solution was decanted and the treated ZSM-5 was washed with distilled water followed by drying at 120° C. Once dry, the treated ZSM-5 was calcined at 540° C. Next, the acid leached ZSM-5 was contacted with steam at 650° C. for 5 hours, thus forming the modified ZSM-5 support.

A mixture comprising 20 wt. % soybean oil and 80 wt. % diesel was contacted with each of catalysts 1-4 under hydrotreating conditions (between about 370-395° C., at 500 psig, at a liquid hourly space velocity of 0.75 hr$^{-1}$). The cold flow properties of the resulting products were determined and are shown in Table 1.

TABLE 1

|  | Catalyst 1 | Catalyst 2 | Catalyst 3 | Catalyst 4 |
|---|---|---|---|---|
| Catalyst active component | Co/Mo | Co/Mo | Co/Mo | Co/Mo |
| Catalyst support | Al$_2$O$_3$ | Al$_2$O$_3$ | ZSM-5 | Modified ZSM-5 |
| Run Temperature (° C.) | 385-395 | 370 | 370 | 370 |
| Product properties ||||
| Density (g/ml) | 0.821 | 0.819 | 0.857 | 0.828 |
| CFPP (° C.) | −2 | −3 | −44 | −26 |
| Cloud point (° F.) | 35 | 35 | −51 | −7 |
| Pour point (° F.) | 22 | 22 | <−76 | −16 |
| Liquid yield (v/v) | 0.98 | 1.03 | 0.64 | 0.90 |

Catalysts 1 and 2 gave high liquid yields, but their products exhibited poor cold flow properties. The product formed from catalyst 3 exhibited very good cold flow properties, but gave a poor liquid yield. Catalyst 4, comprising the modified ZSM-5 support, gave a much improved liquid yield and products have good cold flow properties.

The properties of the hydrotreated product of catalyst 4 were compared to that of 100% diesel (see, Table 2). Not only did the hydrotreated product exhibit superior cold flow properties, but it also had a higher cetane number.

TABLE 2

|  | 100% Diesel | Hydrotreated Product of 20% Soybean Oil/80% Diesel Using Catalyst 4 |
|---|---|---|
| Cetane number | 51.9 | 53.9 |
| CFPP (° C.) | −14 | −26 |
| Cloud point (° F.) | 10 | −7 |
| Pour point (° F.) | −8 | −16 |
| Density (g/ml) | 0.826 | 0.828 |

EXAMPLE 2

In this example, a hydrotreating process was performed using four different catalyst arrangements, and the cold flow properties of the resulting products were compared. A mixture comprising 20 wt. % vegetable oil and 80 wt. % diesel was used as the reaction feed. The sulfur concentration of the feed was about 370 ppm. The hydrotreating process was conducted at 400° C., 500 psig, and a liquid hourly space velocity of 0.75 hr$^{-1}$.

The first catalyst arrangement comprised only a Co/Mo on alumina catalyst (catalyst 1 from Example 1). The second catalyst arrangement comprised only a Co/Mo on a modified ZSM-5 catalyst (catalyst 4 from Example 1). The third catalyst arrangement comprised a first layer containing catalyst 1 (Co/Mo on alumina) followed by a second layer of catalyst 4 (Co/Mo on modified ZSM-5). The fourth catalyst arrangement comprised a first layer of catalyst 4 followed by a layer of catalyst 1. In the third and fourth catalyst arrangements, the volume ratio of catalyst 1 to catalyst 4 was about 2.

The cold flow properties and sulfur content of the products of each hydrotreating reaction were determined. These properties are summarized in Table 3.

TABLE 3

| Catalyst arrangement | #1 (Co/Mo on alumina) | #2 (Co/Mo on ZSM-5) | #3 (Co/Mo on alumina followed by Co/Mo on ZSM-5) | #4 (Co/Mo on ZSM-5 followed by Co/Mo on alumina) |
|---|---|---|---|---|
| Cloud point | 35° F. | −5° F. | 3° F.* | 1° F.** |
| Pour point (° F.) | 30° F. | −18° F. | −10° F.* | −8° F.** |
| Sulfur concentration | 10 ppm | 50 ppm | 10-15 ppm | 10-15 ppm |
| Liquid yield (v/v) | — | <95% | <95% | >95% |

*Initial values. The cloud and pour points increased to 29° F. and 16° F. at 300 hours of time on stream (TOS)
**Initial values. The cloud and pour points slowly increased to 12° F. and 4° F. at 300 hours TOS Thus, it was discovered that contacting the reaction feed with the Co/Mo on ZSM-5 followed by Co/Mo on alumina gave an increased liquid yield and lower cloud and pour points.

The embodiments of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process comprising: contacting a fluid comprising at least one fatty material selected from the group consisting of triglycerides, diglycerides, monoglycerides, and free fatty acids with a dewaxing catalyst and a hydrotreating catalyst under conditions sufficient for converting at least a portion of said at least one fatty material into at least one member selected from the group consisting of C10-C30 hydrocarbons and combinations thereof,
   wherein said dewaxing catalyst comprises a Group VIII metal and a Group VIB metal on a porous acidic support selected from the group consisting of zeolites, molecular sieves, and combinations thereof,
   wherein said hydrotreating catalyst comprises a Group VIII metal and a Group VIB metal on an alumina support, and
   wherein said fluid contacts said dewaxing catalyst prior to contacting said hydrotreating catalyst.

2. The process according to claim 1, wherein said dewaxing catalyst comprises cobalt and molybdenum on a zeolite support.

3. The process according to claim 2, wherein said zeolite support comprises ZSM-5.

4. The process according to claim 1, wherein said hydrotreating catalyst comprises cobalt and molybdenum on said alumina support.

5. The process according to claim 1, wherein said dewaxing and hydrotreating catalysts are contained within a reactor and arranged as at least one layer of dewaxing catalyst and at least one layer of hydrotreating catalyst.

6. The process according to claim 5, wherein said reactor includes a plurality of alternating layers of dewaxing and hydrotreating catalysts.

7. The process according to claim 1, wherein said dewaxing catalyst is contained in a first reactor, and said hydrotreating catalyst is contained in a second reactor.

8. The process according to claim 1, wherein said fluid, prior to being contacted with said hydrodewaxing catalyst and said hydrotreating catalyst, comprises at least one feed hydrocarbon having a boiling point of between about 80° F. to about 1000° F.

9. The process according to claim 8, wherein said at least one feed hydrocarbon is selected from the group consisting of gasoline, naphtha, jet fuel, kerosene, diesel fuel, light cycle oil (LCO), vacuum gas oil, atmospheric gas oil, atmospheric tower bottoms, and combinations thereof.

10. The process according to claim 8, wherein said at least one feed hydrocarbon is present in said fluid at a level of between about 0.1 to about 99.9 weight %.

11. The process according to claim 8, wherein the weight ratio of said at least one fatty material to said at least one hydrocarbon is between about 1:1000 to about 1000:1.

12. The process according to claim 1, wherein said fluid comprises between about 0.1 to about 99.9 weight % of said at least one fatty material.

13. The process according to claim 1, wherein said fluid, after being contacted with said catalysts, presents a cloud point of below about 20° F.

14. The process according to claim 1, wherein said fluid, after being contacted with said catalysts, presents a pour point of below about 10° F.

15. The process according to claim 1, wherein said contacting step is performed at a pressure of less than about 2000 psig and at a temperature of between about 500° F. to about 800° F.

16. The process according to claim 1 wherein said fluid, after said contacting step, comprises between about 0.1 to about 99.9 weight % of C10-C30 hydrocarbons.

17. The process according to claim 1, wherein said fatty material is selected from the group consisting of vegetable oil, yellow grease, animal fats and mixtures thereof.

18. The process according to claim 1, wherein said process results in a liquid yield of at least about 95 weight %.

19. The process according to claim 2, wherein said zeolite support having undergone an acid leaching step and a steam treatment step prior to depositing said cobalt and molybdenum thereon.

20. The process according to claim 19, wherein said zeolite, prior to said acid leaching step, comprises alumina, and wherein said acid leaching step comprises contacting said zeolite with an acid for a sufficient period of time to remove at least a portion of said alumina present therein.

21. The process according to claim 20, wherein said acid is hydrochloric acid.

22. The process according to claim 19, wherein said steam treating step comprises contacting said zeolite with steam at a temperature of between about 400° C. to about 750° C. for at least about 2 hours.

* * * * *

UNITED STATES PATENT AND TRADEMARK OFFICE
CERTIFICATE OF CORRECTION

| | | |
|---|---|---|
| PATENT NO. | : 7,955,401 B2 | Page 1 of 1 |
| APPLICATION NO. | : 11/778295 | |
| DATED | : June 7, 2011 | |
| INVENTOR(S) | : Ghonasgi et al. | |

It is certified that error appears in the above-identified patent and that said Letters Patent is hereby corrected as shown below:

Title Pg, Item (75) Inventors; - first named inventor:

"Dhananjay R. Ghonasgi" should read --Dhananjay B. Ghonasgi--

Signed and Sealed this
Ninth Day of August, 2011

David J. Kappos
*Director of the United States Patent and Trademark Office*